June 7, 1966   J. H. FABRICIUS   3,255,395
CERAMIC CAPACITOR
Filed May 13, 1963
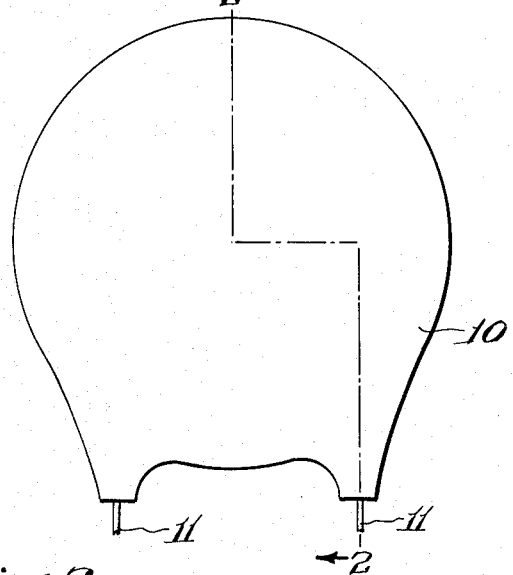
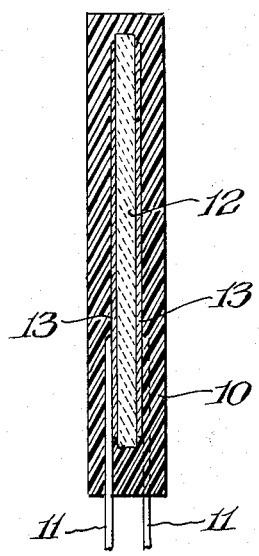
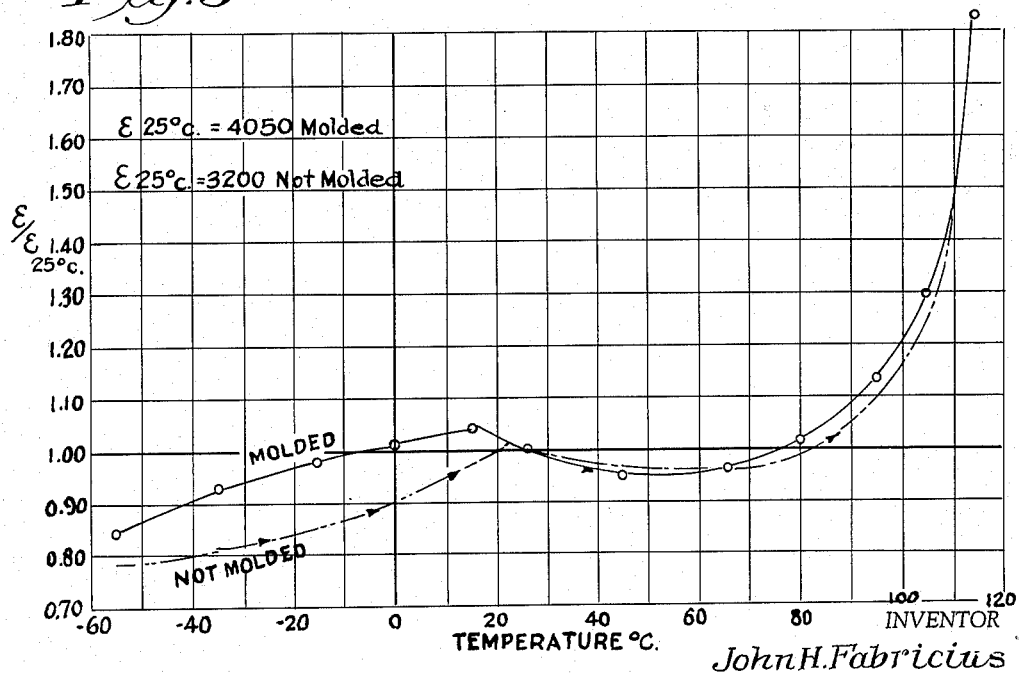
INVENTOR
John H. Fabricius
BY Connolly and Hutz
ATTORNEYS

United States Patent Office 3,255,395
Patented June 7, 1966

3,255,395
CERAMIC CAPACITOR
John H. Fabricius, Stamford, Vt., assignor to Sprague Electric Company, North Adams, Mass., a corporation of Massachusetts
Filed May 13, 1963, Ser. No. 279,950
11 Claims. (Cl. 317—258)

This invention relates to a ceramic capacitor in a molded casing and more particularly to a thin ceramic body having electrodes on opposed surfaces and a casing molded around the capacitor.

Ceramic capacitors may be made up of a wafer of a dielectric ceramic such as a barium titanate with electrodes fired on opposite surface of the wafer. This provides a temperature stable capacitor of high capacitance. The dielectric constant of these capacitors per unit size is outstanding and the capacitors have a good stability over a wide range of uses and conditions of use. It is desirable to provide maximum capacitance per unit surface in these capacitors without sacrificing those desirable properties.

There is a demand for electrical components of reduced size with the same or improved characteristics.

It is an object of this invention to provide a small ceramic capacitor in a molded casing having improved characteristics.

A still further object of this invention is to provide a ceramic capacitor of increased capacitance per unit volume.

Another object is to provide a ceramic capacitor having good temperature coefficient characteristics.

The above as well as additional objects of the present invention will be more clearly understood from the following description of several of its exemplifications, reference being made to the accompanying drawing, wherein:

FIGURE 1 is a plan view of a ceramic capacitor according to this invention;

FIGURE 2 is a side view in section taken along the line 2—2 of FIGURE 1;

FIGURE 3 is a comparative curve showing the temperature coefficient of a molded and unmolded unit.

The objects of this invention have been attained by the molding of a ceramic disc capacitor in a material which at room temperature will exert a radially compressive force thereon. This results in a significant improvement in at least two of the electrical characteristics thereof.

It is theorized that the compression causes a redistribution of domains such that the proportion of c-domains in the thickness direction of the disc increases and the proportion of a-domains decreases relative to the unstressed situation. Since the dielectric constant of a c-domain is about $\frac{1}{30}$ that of an a-domain it would be expected that the radial compression on a ceramic disc would decrease the value of the dielectric constant in the thickness direction of the disc relative to the unstressed condition. Unexpectedly, however, it has been discovered that when an extremely fine grain barium titanate ceramic is employed in forming the disc capacitors, radial compression increases the capacitance thereof.

In order to exhibit this phenomenon the grain size must be less than 20 microns with the lower limit being approximately 0.5 micron. It is preferred that the particle size fall within the range of 0.5 to 5 microns, the average being about 1 micron.

The ceramic material contemplated is generally designated as a barium titanate ceramic. This includes not only stoichiometric barium titanate per se but also compositions which consist essentially of barium titanate and which have any of the known prior art additives incorporated therein to improve the physical and/or electrical characteristics thereof. Examples of such additives are titania, sodium niobate, nickel oxide, zirconates, strontium chromate, strontium titanate, etc.

The electrodes contemplated are of silver or the platinum group metals.

In general, the capacitors are constructed in the following manner, reference being made to FIGURES 1 and 2: Opposed electrodes 13 are applied to a barium titanate wafer or disc 12 either before or after firing the dielectric to maturity, depending upon the electrodes employed. Subsequently, the electrodes are each provided with its respective lead 11. The resultant capacitor is then encased in a jacket 10 of a composition which will exert a radially compressive force on the capacitor at room temperature.

The materials contemplated as the jacketing compositions are the thermosetting resins and glass compositions having a coefficient of thermal contraction greater than that of the ceramic. Examples of the first class of materials are: alkyl molding compounds, allyl resins, amino resins, epoxy resins, furane resins, isocyanate resins, phenolics, polyester resins, etc. An example of the second class of materials is a potash-soda-lead glass. Among the resin compositions, specific materials contemplated are phenol-formaldehyde resins, phenol furfural, urea formaldehyde, melamine formaldehyde, etc.

It is usual in the art to employ a filler material dispersed throughout the resin. Although the use of a filler reduces shrinkage and coefficient of expansion, the advantages far outweigh the disadvantages. Among the advantages are improvements in surface appearance, strength, resistance to environment, and moldability. It also acts as an extender and thus reduces cost.

The filler material can be organic such as wood flour, macerated fabric, etc. or inorganic such as asbestos, diatomaceous earth, silica, etc. The filler material can be present in an amount up to about 90% by weight of the total composition.

When using a resin composition a convenient and advantageous method of molding the capacitors of the present invention is by the well-known transfer molding technique. This method is preferred because the resin shrinkage is from 25 to 50% greater than in compression molding.

The encasement of the capacitors takes place at an elevated temperature, which varies depending upon the composition employed. The transfer molding temperature is usually in the range of from about 240° F. to about 400° F. at pressures ranging upward from about 50 p.s.i. As a result of the molding, which includes curing and cooling, the resin, which has a coefficient of thermal expansion greater than the ceramic, contracts and shrinks, exerting a compressive force on the capacitor. When a glass within the contemplation of the present invention is employed, higher temperatures are necessary.

To illustrate the teaching of the invention a series of comparisons were made between ceramic capacitors having a barium titanate dielectric of fine grain size and of comparatively large grain size. A non-barium titanate ceramic capacitor was also tested. The effect on the capacitance of the units after molding a jacket of a thermoset resin about each unit is set out below.

The unjacketed units were formed by more or less conventional means. For example, the ceramic in the form of discs were fired to maturity; after cooling, silver electrodes were fired on and then suitable leads were applied to the electrodes. The units were molded in a cured epoxy molding composition, said composition comprising the reaction product of epichlorohydrin and bisphenol. Approximately 65% by weight of silica is employed as a filler. A material generally answering this description is "EMC" N-562E, a silica-filled epoxy molding compound obtainable from Pacific Resins and Chemical, Inc., 42 South 3rd Street, Newark, Ohio.

The resin jacket had a wall thickness of approximately 60 mils and a peripheral web of about 70 mils.

Table

| Dielectric | Ave. Grain Size, μ | Dielectric Disc Size | Electrode Area in.² | Cap. before molding | Change in cap. at 25° C. after molding, percent |
|---|---|---|---|---|---|
| (1) Stoichiometric BaTiO₃ | 1 | 0.019″ th., 0.475″ dia. | 0.177 | 6,878 mmf. (ave. of 7 units). | +33.0 |
| (2) Stoichiometric BaTiO₃ | 23 | 0.024″ th., 0.487″ dia. | 0.185 | 4,191 mmf. (ave. of 6 units). | −5 |
| (3) 98 wt. percent BaTiO₃+2 wt. percent TiO₂ | 1 | 0.018″ th., 0.485″ dia. | 0.140 | 5,587 mmf. (ave. of 4 units). | +31.4 |
| (4) 98 wt. percent BaTiO₃+2 wt. percent TiO₂ | 53 | 0.019″ th., 0.480″ dia. | 0.180 | 3,083 mmf. (ave. of 6 units). | −40.0 |

Example 1 compared with Example 2 shows that a capacitor employing a fine grain (about 1 micron), stoichiometric barium titanate as the dielectric has its capacitance significantly increased by molding said capacitor in a resin of the class described. Example 3 compared with Example 4 likewise shows the criticality of the grain size and also shows that the increase is not limited to pure barium titanate. The excess titania is a prior art additive which inhibits grain growth. Another series of capacitors wherein the ceramic consisted of 95.5 wt. percent $BaTiO_3$ and 4.5 wt. percent $NaNbO_3$, and having an average grain size of approximately 1 micron, likewise exhibited an increase in capacitance on being molded in the thermoset resin jacket. The increase averaged about 25%.

The last series were ceramic capacitors wherein the dielectric was not a fine grain barium titanate but a fine grain (average size 5 microns) ferroelectric consisting of $K_{0.5}Na_{0.5}NbO_3$. These units exhibited an average capacitance decrease of 24% as a consequence of being molded in the same manner and with the same material as the preceding examples. This indicates that only a fine grain barium titanate (stoichiometric or additive-modified) ceramic is responsive to the peripheral pressure exerted by the thermoset resin jacket.

In FIGURE 3 the temperature coefficient of the molded units (Example 3 of the table) is shown by the solid line curve and that of the non-molded unit by the broken line. The figure shows the change in the ratio of the dielectric constant of the ceramic between that at 25° C. and that at the various temperatures within the range of −60° C. and 120° C. It is clear from this showing that the molded units exhibit less change in capacitance with change in temperature than the unmolded units.

When encapsulating the capacitors of the present invention in a glass of the type disclosed, the following general procedure is followed. The glass is pulverized to a fine powder and mixed with a temporary binder, e.g. gums of the arabin or bassorin type. This composition is applied to the capacitor unit and fired to remove the binder and fuse the glass powder. The effect is the same as explained in connection with the resin jacket.

The lines of force which are important to this invention are the compression lines of force which converge from the periphery of the unit. There is no definite thickness that the jacket should be since the optimum will vary depending upon the material selected. The wall thickness should not be greater than the thickness of the peripheral border or web. Investigation has revealed that the wall contributes nothing in the way of useful force and is desirable only for purposes of protection of the electrodes and physical support of the peripheral web. In general, the thickness of the wall and the web should not be less than about 10 mils because of the difficulty of control and the lack of significant pressure.

As various possible embodiments might be made of the above invention and as various changes might be made in the embodiments above set forth, it is to be understood that all matter herein set forth or shown in the accompanying drawing is to be interpreted as illustrative and not in a limiting sense.

What is claimed is:

1. An electrical capacitor comprising a fired disc of a barium titanate, said barium titanate having a grain size of less than 20 microns, cooperating electrodes fired-on said disc, lead-wires affixed to said electrodes and a radially compressive force-exerting jacket about the capacitor, said jacket being of a material selected from the group consisting of a thermosetting composition and a glass composition each having a coefficient of thermal contraction greater than said titanate.

2. An electrical capacitor comprising a fired disc of a barium titanate, said barium titanate having a grain size of less than 20 microns, cooperating electrodes fired-on said disc, lead-wires affixed to said electrodes and a radially compressive force-exerting jacket of a thermosetting composition having a coefficient of thermal contraction greater than said titanate molded about the capacitor.

3. An electrical capacitor comprising a fired disc of a barium titanate, said barium titanate having a grain size of less than 20 microns, cooperating electrodes fired-on said disc, lead-wires affixed to said electrodes and a radially compressive force-exerting jacket of a glass having a coefficient of thermal contraction greater than said titanate formed about the capacitor.

4. An electrical capacitor comprising a fired disc of a barium titanate, said barium titanate having a grain size of about 0.5 to about 5 microns, cooperating electrodes fired-on said disc, lead-wires affixed to said electrodes and a radially compressive force-exerting jacket of a thermosetting composition having a coefficient of thermal contraction greater than said titanate molded about the capacitor.

5. An electrical capacitor comprising a fired disc of a barium titanate, said barium titanate having a grain size of about 0.5 to about 5 microns, cooperating electrodes fired-on said disc, lead-wires affixed to said electrodes and a radially compressive force-exerting jacket of a glass composition having a coefficient of thermal contraction greater than said titanate formed about the capacitor.

6. An electrical capacitor comprising a fired disc of a barium titanate, said barium titanate having an average grain size of about 1 micron, cooperating electrodes fired-on said disc, lead-wires affixed to said electrodes and a radially compressive force-exerting jacket of a thermosetting composition having a coefficient of thermal contraction greater than said titanate molded about the capacitor.

7. An electrical capacitor comprising a fired disc of a barium titanate, said barium titanate having an average grain size of about 1 micron, cooperating electrodes fired-on said disc, lead-wires affixed to said electrodes and a radially compressive force-exerting jacket of a glass composition having a coefficient of thermal contraction greater than said titanate formed about the capacitor.

8. An electrical capacitor comprising a fired disc of a barium titanate, said barium titanate having an average grain size of about 1 micron, cooperating electrodes fired-on said disc, lead-wires affixed to said electrodes and a radially compressive force-exerting jacket of a thermosetting resin having a coefficient of thermal contraction greater than said titanate molded about the capacitor, said resin having up to 90% by weight of a filler material.

9. An electrical capacitor comprising a fired disc of a barium titanate containing excess titania, said disc having a grain size of about 1 micron, cooperating electrodes fired-on said disc, lead-wires affixed to said electrodes and a radially compressive force-exerting jacket of an epoxy resin having a coefficient of thermal contraction greater than said titanate molded about the capacitor, said resin being filled with up to 90% by weight of silica.

10. The capacitor of claim 9 wherein the resin is filled with about 65% by weight of silica.

11. An electrical capacitor comprising a fired disc of a barium titanate, said barium titanate having an average grain size of about 1 micron, cooperating electrodes fired-on said disc, lead-wires affixed to said electrodes and a radially compressive force-exerting jacket of a potash-soda-lead glass having a coefficient of thermal contraction greater than said titanate formed about the capacitor.

References Cited by the Examiner

UNITED STATES PATENTS

| | | | |
|---|---|---|---|
| 2,606,955 | 8/1952 | Herrick | 317—258 |
| 2,706,798 | 4/1955 | Kodama | 174—52 X |
| 2,972,180 | 2/1961 | Gulton | 317—261 X |
| 3,114,868 | 12/1963 | Feldman | 317—261 |
| 3,144,318 | 8/1964 | Bruen | 264—272 |
| 3,157,835 | 11/1964 | Cirkler et al. | 317—258 X |

ROBERT K. SCHAEFER, *Primary Examiner.*

DARRELL L. CLAY, JOHN F. BURNS, *Examiners.*

E. A. GOLDBERG, *Assistant Examiner.*